United States Patent [19]

Kurth et al.

[11] 4,349,722

[45] Sep. 14, 1982

[54] MOISTURE PROTECTION AND DRAINAGE ARRANGEMENT FOR MOTOR VEHICLE CLOSURE LOCKS

[75] Inventors: Hermann W. Kurth; Rolf Krügener, both of Sindelfingen, Fed. Rep. of Germany

[73] Assignee: Daimler-Benz Aktiengesellschaft, Stuttgart, Fed. Rep. of Germany

[21] Appl. No.: 72,461

[22] Filed: Sep. 4, 1979

[30] Foreign Application Priority Data

Sep. 16, 1978 [DE] Fed. Rep. of Germany ....... 2840410

[51] Int. Cl.[3] .......................... E05B 17/00; B60J 5/00; H05B 3/00

[52] U.S. Cl. ................................. 219/202; 34/243 R; 70/431; 219/201; 219/274; 261/142; 261/94; 261/95; 291/1

[58] Field of Search ................................ 219/200-202, 219/274; 174/14 R; 70/431; 292/1, DIG. 37; 34/243 R; 261/142, 94, 95

[56] References Cited

U.S. PATENT DOCUMENTS

| | | | |
|---|---|---|---|
| 2,057,353 | 10/1936 | Whittemore | 219/274 |
| 2,232,577 | 2/1941 | West | 70/431 X |
| 2,710,386 | 6/1955 | Hall | 174/14 R |
| 2,774,855 | 12/1956 | Simmons | 70/431 X |
| 3,715,565 | 2/1973 | Nutt | 219/274 |

FOREIGN PATENT DOCUMENTS

| | | | |
|---|---|---|---|
| 2610946 | 9/1977 | Fed. Rep. of Germany | 219/201 |
| 2733644 | 2/1979 | Fed. Rep. of Germany | 70/431 |
| 2758849 | 7/1979 | Fed. Rep. of Germany | 219/202 |

*Primary Examiner*—A. Bartis
*Attorney, Agent, or Firm*—Craig and Antonelli

[57] ABSTRACT

A lock for vehicle closures or flaps, especially doors, trunk lids and fuel tank caps or lids, wherein the cylinder of the lock includes a drain opening in the lower part thereof which communicates with the interior of the cylinder and through which moisture, especially water, can be drained from the interior of the lock. A drain line formed as a moisture absorbing wick provided with an electric heating element powered by the vehicle electric system is connected to the drain opening with the line being guided from the cylinder through an element, such as a door handle, containing the cylinder, to the interior of the closure. A water deflecting shield overlies the portion of the drain line within the closure. The drain line terminates in a vertically disposed drain section from which moisture drained from the cylinder can evaporate or drip off. The drain line may be operatively associated with a vacuum source on the vehicle to assist in drawing off moisture from the cylinder. Energization of the heating element ensures sufficient evaporation of moisture from the drain line even under highly unfavorable weather conditions.

21 Claims, 1 Drawing Figure

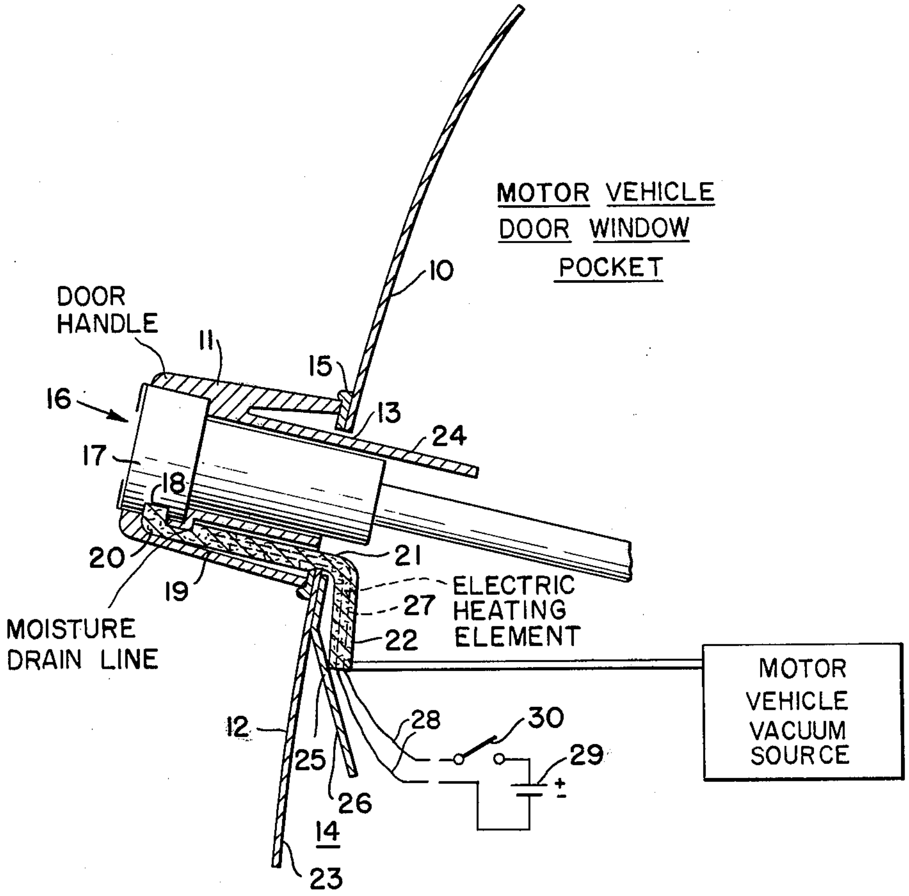
MOTOR VEHICLE
DOOR WINDOW
POCKET
10
DOOR
HANDLE
11
15
16
13
24
17
18
20
21
19
ELECTRIC
HEATING
ELEMENT
27
22
MOISTURE
DRAIN LINE
MOTOR
VEHICLE
VACUUM
SOURCE
28
30
29
12
25
26
14
23

MOISTURE PROTECTION AND DRAINAGE ARRANGEMENT FOR MOTOR VEHICLE CLOSURE LOCKS

The present invention relates to a lock arrangement, and, more particularly, to a lock for doors, trunk lids, gas caps or the like of motor vehicles.

A lock of the aforementioned type has been proposed which includes a drain opening in the lower part thereof which communicates with an interior of a cylinder of the lock, through which opening moisture, especially water, can be drained from the interior of the lock.

As can be appreciated, water can enter the interior of the lock cylinder as a result of, for example, washing the motor vehicle, especially with the high pressure spraying of the washer, as a result of the insertion of a wet key in the cylinder of the lock, and as a result of cooling of humid air and the formation of condensation. The presence of such water can result in failure of the cylinder at temperatures below 0° C. since ice particles form which either prevent the key from being inserted into the cylinder or block the tumblers of the cylinder.

Locks of the aforementioned type, wherein a cylinder comprises a drain opening in its lower part, through which drain opening water can escape from the interior of the cylinder of the lock have been proposed; however, in certain constructions of the lock cylinder and/or its mounting, for example, in the handle of a door of the motor vehicle or even directly in the motor vehicle door, it is impossible to allow the water to drain directly through the drain opening in the cylinder.

Additionally, when the drain opening terminates in the open, there is danger that the moisture, and especially water, can penetrate the cylinder through the drain opening when the vehicle is washed.

The aim underlying the present invention essentially resides in providing a lock of the aforementioned type which ensures a reliable drainage of water from the interior of the cylinder through its drain opening and simultaneously ensures that moisture, especially water, cannot penetrate the interior of the cylinder through the drain opening when, for example, the vehicle is being washed.

According to advantageous features of the present invention, a drain line is connected to the drain opening with the line being guided from the lock cylinder through an element containing the cylinder and from there to its interior with a further terminal drain section running in an essentially vertical direction relative to the motor vehicle.

By virtue of the provision of the drain line and its arrangement in accordance with the present invention, it is possible to conduct drain water out of the drain opening of the cylinder of the lock even over rather long distances to a point at which the water can be allowed to drain downwardly into, for example, an interior of the door of the motor vehicle. In this manner, any possible icing of the cylinder is reliably prevented.

Additionally, by virtue of the constructional features of the present invention, it is ensured that moisture, especially wash water which may be introduced during a washing of the vehicle cannot travel in the opposite direction and penetrate the interior of the cylinder. Therefore, the present invention provides the possibility of conducting drain water over long distances through the drain opening of the lock cylinder, for example through the door handle, even in the case of special embodiments of the cylinder as well as its mounting either in the door handle or directly in the door of, for example, the motor vehicle, with the necessary slope and/or required channel cross section to guarantee reliable drainage of the water.

In accordance with another advantageous feature of the present invention, the drain line is fashioned of a wick made of, for example, felt or another material which absorbes moisture. By virtue of the forming of the drain line as a wick, not only is reliable absorption of water from the interior of the lock cylinder through the drain opening ensured but simultaneously the moisture absorbed by the wick is allowed to evaporate from the surface thereof.

In accordance with yet another feature of the present invention, the component containing the lock cylinder, for example, a handle of the motor vehicle door, includes a channel below the cylinder in which channel the drain line is disposed. This construction makes it possible to conduct the drain line, fashioned as a wick, over long distances and through the door handle and from the door handle into, for example, the interior of the motor vehicle door where the absorbed water can be evaporated especially well or can be allowed to drip off the end of the drain line.

The dripping off the end of the drain line can further be enhanced if the drain line is guided through an opening in an outside wall of the door to the door interior.

To ensure that moisture, if not evaporated on the way to the drain section, is then evaorated in an area of the drain cross section which offers large evaporation area, in accordance with the present invention, the drain section extending from the channel in the door handle and opening in the outside wall of the door to the door interior is guided at a considerable distance from the inside surface of the outside wall of the door and has a length which is nearly as great as but is at least not much smaller than the length of the other section of the drain line which is contained in the channel. Thus, water which is not evaporated can be allowed to drip downward inside the vehicle door at a quite specific point depending on the lignment of the drain section.

Moreover, a projecting shield projecting from an interior of the door at a distance above the drain section may be constructed to serve as a shield for the drain section to prevent it from being contacted by moisture coming through a window pocket in the vehicle door. By virtue of such a construction, the drain section of the drain line is so covered that water cannot penetrate from above through, for example, the window opening in the vehicle door.

So as to incur practically no additional expense in providing the projecting shield, such shield may be disposed above the lock cylinder and be preferably shaped from the handle of the door of the motor vehicle.

In accordance with yet a further feature of the present invention, a spacer is disposed in the interior of the door with the spacer serving to hold an end of the drain section at a distance from the interior of the outside wall of the door of the motor vehicle. The provision of the spacer ensures that the drain section, with its evaporating surface, contacts practically no point in a vicinity of the door interior so that the entire outer surface of the drain section runs freely for its entire length within the door and is therefore available for and used for the best and fastest evaporation possible.

Advantageously, a sloping surface is providing in the interior of the door with the surface being abutted endwise by the drain section and with the surface also having a guide section connected downward thereto by means of which guide section moisture, especially water, can be conducted away from the end of the drain section. The sloping surface also allows a good run-off for the water downward inside of the door. The guide section which abuts at the sloping surface promotes water run-off from the free end of the drain section to the extent that the absorbed water has not been previously evaporated. The guide section can be aligned so that the drain water is deliberately guided to escape rapidly to the exterior of the motor vehicle through, for example, a lower opening in the door.

Moreover, in accordance with the present invention, the drain line may be provided on its circumference or its interior with a heating line. The heating line may be in the form of a resistance heating wire which is powered by the vehicle electric system.

It is also possible in accordance with the present invention to provide a vacuum line which is operatively associated with the wick so as to draw the moisture therefrom. Likewise, a vacuum line may be connected to the drain channel to draw off the moisture.

As can be appreciated, a relatively weak electrical resistance heater would be quite sufficient for the purpose of drawing off the moisture with the heater ideally being switched on only when the vehicle is in operation so as to thereby heat the drain line and, in turn, ensure sufficient evaporation of the water even under highly unfavorable weather conditions.

Accordingly, it is an object of the present invention to provide a lock construction for doors, trunk lids, gas caps or the like of motor vehicles which avoids, by simple means, shortcomings and disadvantages encountered in the prior art.

Another object of the present invention resides in providing a lock construction for doors, trunk lids, tank caps or the like of motor vehicles which reliably prevents an icing of the lock cylinder at temperatures below 0° C.

Yet another object of the present invention resides in providing a lock construction for doors, trunk lids, gas caps or the like of motor vehicles which precludes the penetration of moisture into an interior of the lock cylinder.

A still further object of the present invention resides in providing a lock construction for doors, trunk lids, gas caps or the like which ensures the reliable absorption of water from the interior of the cylinder through the drain opening.

These and other objects, features, and advantages of the present invention will become more apparent from the following description when taken in connection with the accompanying drawing which shows, for the purposes of illustration only, one embodiment in accordance with the present invention, and wherein:

The single FIGURE of the drawing is a partially schematic cross-sectional view through a motor vehicle door with a handle and lock construction in accordance with the present invention.

Referring now to the single FIGURE, a motor vehicle handle 11 is mounted in a conventional manner on an outside wall 10 of a motor vehicle door. The handle 11 projects beyond an exterior surface of the outside wall 10 and is fitted in place and sealed against the penetration of moisture from the exterior into the door interior 14 by means of a seal 15 disposed in a vicinity of an opening 13 in the outside wall 10. A lock generally designated by the reference numeral 16 includes a cylinder 17 which partially extends through the opening 13 to the door interior 14. The lock 16 is located inside the visible part of the handle 11.

The cylinder 17 is provided with a drain opening 18 in a lower part thereof with the drain opening 18 communicating with an interior of the cylinder 17. The drain opening 18 serves to drain moisture such as, for example, water or condensation, from the interior of the cylinder 17. A channel 19 is arranged below the cylinder 17 and inside a portion of the handle 11. The channel 19 has at its one end, i.e., the left end in the FIGURE of the drawing, a curved portion which joins the drain opening 18 and, at its other end, i.e., disposed to the right of the single FIGURE of the drawing, terminates at a level of the opening 13 and seal 15 located therein. The channel 19 is provided with sloping areas running from the upper left to the lower right in the drawing.

A drain line 20 is disposed inside the channel 19 and is connected to the drain opening 18. The drain line 20 may be constructed as, for example, a wick or the like made of felt or another material which absorbs moisture well. The cross section of the channel 19 and the drain line 20 is dimensioned so that the drain line 20 has a sufficient thickness so as to be able to absorb the amount of water which penetrates the cylinder 17 and runs out of the cylinder 17 through the drain opening 18.

The drain line 20, connected to the drain opening 18, runs from the cylinder 17 by way of the drain opening 18 through a lower part of the handle 11 which contains the cylinder 17. The drain line then extends through an opening 21 in the lower part of the handle 11 and through opening 13 in the outside wall and extends to the interior 14 of the door. In this area, the drain line 20 is guided with its end drain section 22 so as to be disposed in an essentially vertical direction relative to the vehicle and extend downwardly.

The drain section 22 runs at a relatively large distance from the interior surface 23 of the outside wall 10. The drain section 22 has a length which is nearly as great as and is at least not significantly shorter than the length of the other section of the drain line 20 which is disposed in the channel 19, projects out of the channel 19 as far as possible thereby providing an extraordinarily large evaporation surface.

A shield 24 projects from the door interior 14 at a distance above the drain section 22. The shield 24 serves so as to protect the drain section 22 against water running downward from the window pocket in the door thereby preventing the freely-exposed drain section 22 from being wetted from above by water. The projecting shield 24 is disposed above the cylinder 17 and is made integral with the door handle 11 in the embodiment shown.

A spacer is provided in the interior 14 of the door with the spacer being constructed as a sloping surface 25 which is fashioned of, for example, a metal strip. The sloping surface 25 serves to hold the bottom end of the drain section 22 at a distance from an inner surface 23 of the outside wall 10 so that the drain section 22 is therefore allowed to run as freely as possible into the air space inside of the interior 14 of the door.

The sloping surface 25 has a guide section 26 which extends diagonally downwardly relative to the outside wall 10. The guide section 26 terminates at a point where the drain section 22 has its end abutting the sloping surface 25. The water, running off the end of the drain section 22, is guided along guide section 26 in a predetermined direction.

In one advantageous configuration of the invention, a means for drawing moisture from the drain line section 22 on the channel 19, or both is provided, which may include a vacuum line means operatively connected to either the drain line section 22 or channel 19, or both, and a vacuum source of the motor vehicle.

Either the entire length of the drain line 20 or at least the length of the drain section 22 which is directed vertically downwardly can be heated by, for example, using a heating line disposed either on the circumference of the drain line 20 or interiorly thereof.

In the embodiment shown in the single FIGURE of drawing, the heating line is in the form of a resistance heating wire 27, indicated by dashed lines in the drawing and located inside the drain line 20. The resistance heating wire 27 is powered by way of wires 28 from vehicle electrical system 29. The heating system may be adapted to be turned off and on by means of a switch 30. Since it is not necessary to provide a high heating power, the resistance heating wire 27 can be given a very thin cross section. This heating arrangement ensures sufficient evaporation of the water even under unfavorable weather conditions when the water has been absorbed from the cylinder 17 by the drain line 20.

The lock construction described hereinabove allows water or moisture, especially condensation, to be removed efficiently from the interior of the cylinder 17 of the lock and also ensures that no icing will occur inside the cylinder 17 even at temperatures of 0° C. and below, which icing could prevent insertion of the key into the cylinder 17 or block the tumblers of the cylinder 17. Moreover, water escaping from the drain opening 18 in the cylinder 17 is absorbed by the drain line 20 which is fashioned as a wick of a felt-like material. The moisture is evaporated primarily in the area of the drain section 22 which hangs down essentially freely. Any water which is not evaporated drips onto the guide section 26 from the drain section 22 and is therefore easier to conduct away.

While we have shown and described one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are emcompassed by the scope of the appended claims.

We claim:

1. In combination with a hollow closure of a motor vehicle, a lock, the lock including a lock cylinder operatively mounted on the closure, and a drain opening means at a lower portion of the lock cylinder, means in communication with an interior of the lock cylinder for draining moisture from the interior, characterized in that a drain line means is connected to the drain opening means, means are provided for guiding the drain line means from the drain opening means to an interior portion of the hollow closure, and in that the drain line means terminates in a drain section disposed in an essentially vertical plane within the closure.

2. The combination according to claim 1, characterized in that the drain line means is formed as a moisture-absorbing wick.

3. The combination according to one of claims 1 or 2, wherein the closure constitutes the door of the motor vehicle, characterized in that the lock cylinder is disposed in a handle of the vehicle door, the guiding means includes a channel means provided in the handle at a position below the lock cylinder for accommodating at least a portion of the drain line means.

4. The combination according to claim 3, characterized in that the door includes an opening in an outside wall thereof through which the drain line means is guided by the guiding means into the interior of the door.

5. The cmbination according to claim 4, characterized in that the drain section extends out of the channel means for a length which is about as great as the length of the section of the drain line means accommodated in the channel means.

6. The combination according to claim 5, characterized in that the door includes a window opening and means are provided at the interior of the door spaced from the drain section for preventing moisture from coming through the window opening of the door from contacting the drain section.

7. The combination according to claim 6, characterized in that the preventing means are constructed as a shielding means projecting into the interior of the door.

8. The combination according to claim 7, characterized in that the shielding means is disposed above the lock cylinder means and is formed as a portion of the handle of the vehicle door.

9. The combination according to claim 8, characterized in that a spacer means is disposed in the interior of the door for maintaining at least an end of the drain section at a predetermined distance from an interior surface of an outside wall of the door.

10. The combination according to claim 9, characterized in that said spacer means includes a sloping surface which is abutted by the end of the drain section, and in that the sloping surface includes a guide section for conducting moisture away from the end of the drain section.

11. The combination according to claim 10, characterized in that means are provided for heating at least the length of the drain section.

12. The combination according to claim 11, characterized in that the heating means is formed as a heating line provided interiorly of the drain line means.

13. The combination according to claim 12, characterized in that the heating line is a resistance heating wire adapted to be operatively connected with an electrical system of the motor vehicle.

14. The combination according to claim 10, characterized in that suction means are provided for drawing moisture from the drain line means.

15. The combination according to claim 10, characterized in that drawing means including a vacuum line means operatively connected to the drain line means and a vacuum source of the motor vehicle is provided for drawing moisture from the drain line means.

16. The combination according to one of claims 1 or 2, characterized in that means are provided for heating at least the length of the drain section.

17. The combination according to claim 16, characterized in that the heating means is a resistance heating wire adapted to be operatively connected with an electrical system of the motor vehicle.

18. The combination according to one of claims 1 or 2, characterized in that a heating means is provided, formed as a heating line interiorly of the drain line means, for heating at least the length of the drain section.

19. The combination according to claim 18, characterized in that the heating line is a resistance heating wire adapted to be operatively connected with an electrical system of the motor vehicle.

20. The combination according to one of claims 1 or 2, characterized in that suction means are provided for drawing moisture from the drain line means.

21. The combination according to claim 20, characterized in that the drawing means includes a vacuum line means operatively connected to the drain line means and a vacuum source of the motor vehicle.

* * * * *